United States Patent
Freed et al.

(10) Patent No.: US 6,360,049 B1
(45) Date of Patent: Mar. 19, 2002

(54) METHOD FOR MANAGING FIBER AND COPPER CABLE IN DISTRIBUTING FRAME OR BAY SHELVES

(75) Inventors: Michael Ray Freed, Sussex County; Mark Richard Jennings, Andover; Frank Salvatore Leone, Berkeley Heights; William Joseph Parzygnat, Morris County; Richard Joseph Pimpinella, Hampton, all of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/495,594

(22) Filed: Feb. 1, 2000

(51) Int. Cl.⁷ .................................. G02B 6/00
(52) U.S. Cl. ..................... 385/134; 385/135; 385/137
(58) Field of Search ................................. 385/134–139

(56) References Cited

U.S. PATENT DOCUMENTS

| | | | | |
|---|---|---|---|---|
| 5,689,604 A | * | 11/1997 | Janus et al. ................ | 385/134 |
| 5,712,942 A | * | 1/1998 | Jenning et al. ............. | 385/134 |
| 5,724,468 A | * | 3/1998 | Leone et al. ................ | 385/134 |
| 5,793,909 A | * | 8/1998 | Leone et al. ............ | 385/134 X |

* cited by examiner

*Primary Examiner*—Phan T. H. Palmer
(74) *Attorney, Agent, or Firm*—Gibbons, Del Deo, Dolan, Griffinger & Vecchione

(57) ABSTRACT

A system an method for managing wire leads that extend from a circuit board of a similar electronic assembly. The device includes a support tray having a top surface and a bottom surface. The circuit board is mounted to the top surface of the support tray. A planar element is provided that is positioned below the bottom surface of the support tray. The planar element engages the wire leads extending from the circuit board. The presence of the planar element causes the wire leads to extend along the bottom surface of the support tray between the bottom surface of the support tray and the planar element. As a result, the wire leads conform to the bottom of the support tray and do not occupy the space behind the circuit board.

15 Claims, 4 Drawing Sheets

METHOD FOR MANAGING FIBER AND COPPER CABLE IN DISTRIBUTING FRAME OR BAY SHELVES

BACKGROUND OF THE INVENTION

1. Field of the Invention

The present invention relates to electronic assemblies used to power and control connector modules contained within a fiber distribution shelf of an optical fiber administration system. More particularly, the present invention relates to the physical management of the various electrical leads that extend from the connector modules within a fiber distribution shelf.

2. Description of the Prior Art

There are many applications that utilize an optical fiber network to establish optical communications between a host digital terminal (HDT) at a central office and an optical network unit (ONU) at a remote location. Since a central office serves as a point of origin for the optical fibers in the optical fiber network, fiber administration systems are typically used at the central office to manage the flow of optical signals as they are directed to the various ONUs along the different optical fibers in the network.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, N.J., the assignee herein.

Each optical distribution frame located at the central office typically defines a plurality of vertical bays, wherein each bay houses several fiber distribution shelves. On each of the fiber distribution shelves are connector modules that receive the ends of all of the individual optical fibers that enter the central office and are contained within the optical fiber network. By terminating each optical fiber at a connector module on one of the different fiber distribution shelves, the location of each optical fiber becomes known within the overall assembly. Once terminated at a known address on one of the fiber distribution shelves, each optical fiber can be selectively coupled to a HDT or a variety of other optical equipment located at the central office.

In order to maintain the quality and integrity of the fiber administration system, the various optical fibers and connections that make up the fiber administration system must be monitored. By using intelligent connector modules, some of the monitoring functions can be performed by the connector modules themselves. Intelligent connector modules contain a microprocessor that runs programs containing algorithms that monitor the various optical signals that pass through each connector module. An example of such an intelligent connector module is described in U.S. patent application Ser. No. 08/709,977 now U.S. Pat. No. 5,793,909, entitled OPTICAL MONITORING AND TESTING MODULE, filed Sep. 9, 1996 which is assigned to Lucent Technologies, the assignee herein.

In a fiber administration system, the connector modules are typically mounted in a row that extends across the interior of each fiber distribution shelf. As a result, each fiber distribution shelf may contain over a dozen separate connector modules. Each of these modules contain connector ports so that each connector module can be coupled to the central controller of the overall fiber administration system. In this manner, the microprocessors contained within the connector modules can communicate with central controller of the fiber distribution system.

A problem that exists is that the space available for electrical and optical leads within the confines of a fiber distribution shelf are very small. As such, it is difficult to organize and access the various electrical and optical leads that lead to and from the connector modules within a fiber distribution shelf. A system that simplifies the organization of leads on a fiber distribution shelf is disclosed in U.S. Pat. No. 5,724,468 to Leone et al, entitled, Electronic Backplane Device For A Fiber Distribution Shelf In An Optical Fiber Administration System, the disclosure of which is incorporated into this application by reference.

In U.S. Pat. No. 5,724,468, a system is shown where an electrical backplane assembly is used to interconnect a plurality of connector modules in a fiber distribution shelf to the central controller of an optical fiber administration system. The electrical backplane assembly mounts upon a bracket assembly within the confines of the shelf structure of the fiber distribution shelf, thereby saving space. However, since the electrical backplane assembly is confined within the same shelf space as are the various connector modules, there is very little space available in the fiber distribution shelf. The wire leads that connect the electrical backplane assembly to the connector modules therefore tend to be very densely packed in the rear of the fiber distribution shelf.

Due to the density of the various wire leads in the rear of a fiber distribution shelf, it is difficult for a technician to access the rear of the various connector modules located on that fiber distribution shelf. Furthermore, it is not uncommon for a technician to accidentally disrupt a connection at the rear of the fiber distribution shelf, while moving his/her hands and tools through the densely packed wires to access the rear of the connector modules.

A need therefore exists in the art for a device that organizes the electrical leads that extend to and from a row of connector modules in a fiber distribution shelf, wherein the device mounts into the confined space of a fiber distribution shelf.

SUMMARY OF THE INVENTION

The present invention is a system and method for managing wire leads that extend from a circuit board of a similar electronic assembly. The device includes a support tray having a top surface and a bottom surface. The circuit board is mounted to the top surface of the support tray. A planar element is provided that is positioned below the bottom surface of the support tray. The planar element engages the wire leads extending from the circuit board. The presence of the planar element causes the wire leads to extend along the bottom surface of the support tray between the bottom surface of the support tray and the planar element. As a result, the wire leads conform to the bottom of the support tray and do not occupy the space behind the circuit board. The circuit board is therefore more easily viewed and accessed by a technician.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
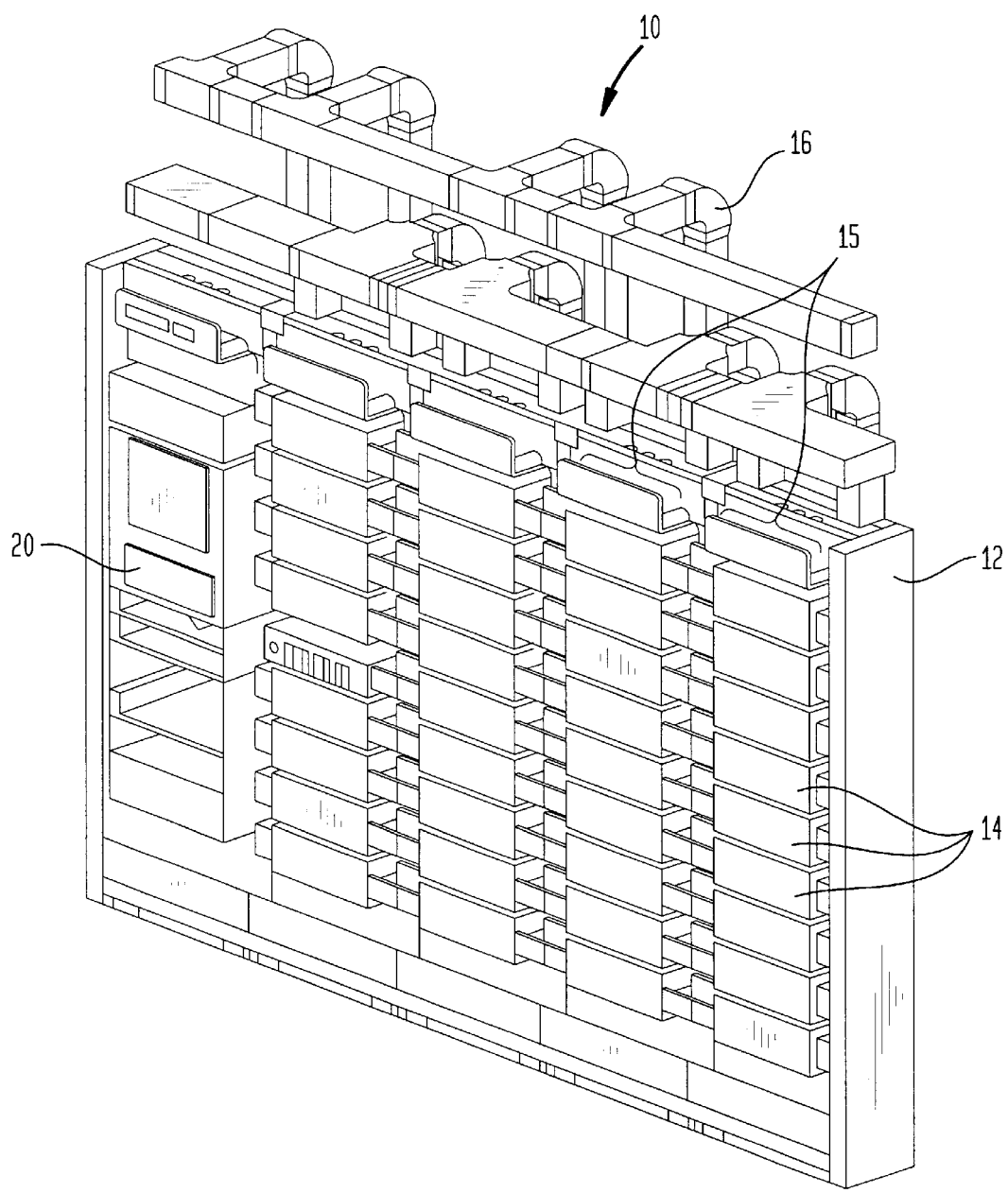
FIG. 1 is a perspective view of an optical fiber administration system containing a first plurality of bays and a second plurality of fiber distribution shelves in each bay.

Referring to FIG. 1, a fiber administration system 10 is shown. Such fiber administration systems are exemplified by the disclosures of U.S. patent application Ser. No. 08/645,108 now U.S. Pat. No. 5,712,942, entitled AN OPTICAL COMMUNICATIONS SYSTEM HAVING DISTRIBUTED INTELLIGENCE, filed May 13, 1996, and U.S. patent application Ser. No. 8/709,978 now U.S. Pat. No. 5,689,604, entitled FIBER OPTIC OPERATION CENTER, filed Sep. 9, 1996. The exemplary fiber administration system 10 illustrated has an optical fiber distribution frame 12 that is affixed in a set position to the floor of a central office. The fiber distribution frame 12 defines a plurality of bays 15. Each bay 15 is a vertical structure that supports a plurality of fiber distribution shelves 14. The fiber distribution shelves 14 are commercially available and come in one of the three standard sizes, having a five inch height, a seven inch height or a nine inch height. A network of conduits 16 lead the various optical fibers from the optical fiber network to the fiber distribution shelves 14.

Contained within the framework of the optical fiber administration system 10 is a central controller 20 that communicates with connector modules (not shown) that are retained within the fiber distribution shelves 14. The connector modules are opto-electronic units into which the various optical fibers that lead into the fiber administration system 10 terminate. The connector modules provide connector ports that enable the various optical fibers to be selectively connected to other equipment contained within the fiber administration system.

Figure 2:
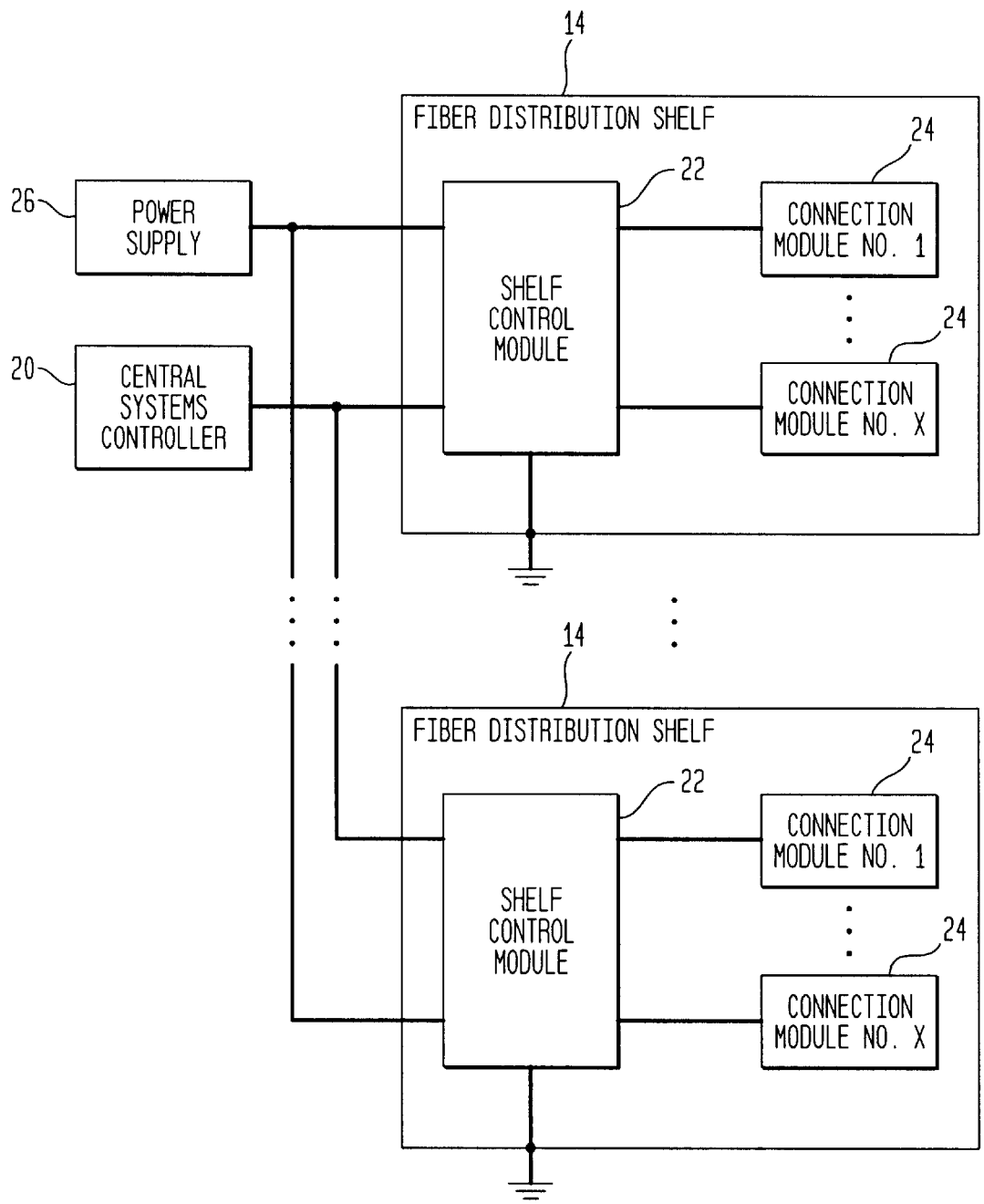
FIG. 2 is block diagram schematic showing the control system architecture of the overall fiber administration system in regard to the control of the individual connector modules.

Referring to FIG. 2, it can be seen that the central controller 20 is coupled to a plurality of shelf control modules 22. A shelf control module 22 exists for every fiber distribution shelf 14 on each bay 15 (FIG. 1) in the framework of the fiber administration system. The shelf control module 22 for each fiber distribution shelf 14 continuously polls the connector modules 24 located on that shelf. If a connector module 24 detects an error or any unacceptable change in the optical signal passing through that connector module 24, then an alarm signal is generated. The alarm signal is read by the shelf control module 22, which acts as an interface with the central controller 20. In the reverse direction, a control signal may be sent to a specific connector module 24 from the central controller 20. In such a scenario, the control signal is first sent to the shelf control module 22, wherein the signal is then directed to the intended connector module 24.

In FIG. 2, it can also be seen that each shelf control module 22 is powered by a common power supply 26. The shelf control module 22 for any given fiber distribution shelf 14 is grounded to the structure of that fiber distribution shelf 14. As a result, any one shelf control module 22 or fiber distribution shelf 14 can be removed from the overall fiber administration system without affecting the flow of power to the remaining fiber distribution shelves 14. On each of the fiber distribution shelves 14, the individual connector modules 24 receive power via the shelf control module 22. As a result, if any shelf control module 22 is unconnected from the power supply 26 all of the connector modules 24 on that fiber distribution shelf 14 are deactivated. However, any one single connector module 24 can be removed from a fiber distribution shelf 14, without affecting the operation of the remaining connector modules 24 on that shelf.

Figure 3:
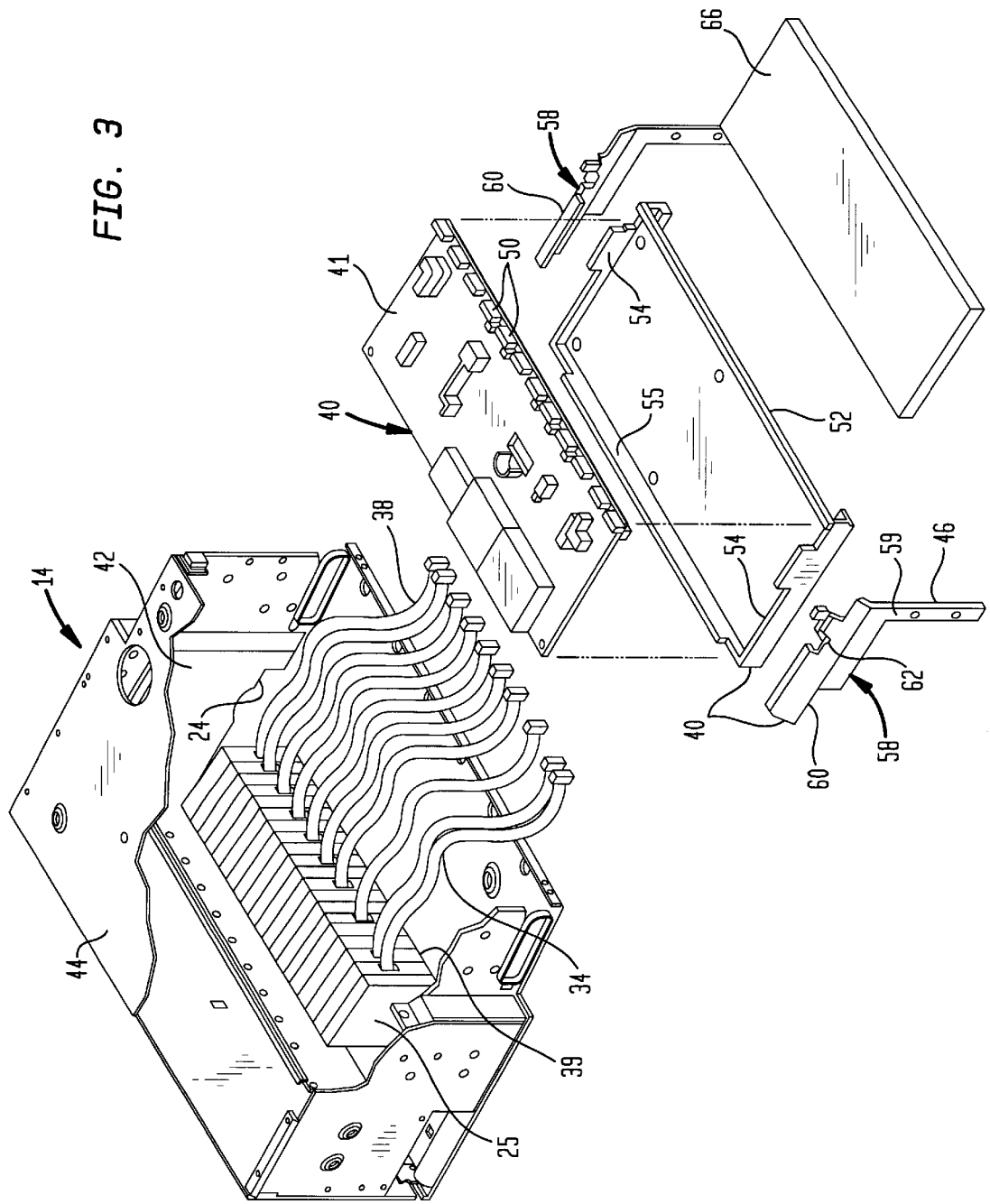
FIG. 3 is an exploded view of an exemplary embodiment of a fiber distribution shelf that has been fragmented to illustrate the presence of connector modules within the fiber distribution shelf.

Referring to FIG. 3, the rear of a fiber distribution shelf 14 is shown. The fiber distribution shelf 14 contains a rack of connector modules 24 that receive optical fibers, via connection ports (not shown) that are disposed on the face of the connector modules 24. A connection port 39 is disposed on the rear of each of the connector modules 24. A ribbon cable 38 connects to each connection port 39 and interconnects each connector module 24 with a circuit board 41 that embodies the shelf control module 22 (FIG. 2).

In FIG. 3, the electronic components that comprise the shelf control module 24 (FIG. 2) and the power supply circuitry are assembled on a common circuit board 41, referred to in this disclosure as an electrical backplane 40. From FIG. 3, it can be seen that when the various connector modules 24 which include PC boards 25 are placed within the distribution shelf 14, an open area 42 of unused space exists in between the top of the connector modules 24 and the top panel 44 of the fiber distribution shelf 14. The electrical backplane 40 is joined to an assembly that mounts to the fiber distribution frame 14 and retains the electrical backplane 40 in place within the open area 42 above the connector modules 24.

The electrical backplane 40 is part of an overall assembly that is specifically sized to fit within the open area 42 of unused space that exists in between the connector modules 24 and the top panel 44 of the fiber distribution shelf 14. The circuitry contained within the electrical backplane 40 is accessible through a plurality of connector ports 50 that are present on the rear edge of the circuit board 41. A connector port 50 exists for each, connector module 24 present in the fiber distribution shelf 14. The connection ports 39 of the connector modules 24 connect to the connector ports 50 on the circuit board 41, via the ribbon cables 38.

The circuit board 41 of electrical backplane 40 is held in a horizontal plane above the connector modules 24 by a bracket assembly 46. The bracket assembly includes a tray structure 52 that is sized to receive the circuit board 41 of the electrical backplane 40. The tray structure 52 has two side walls 54 and a rear wall 55 that abut against the circuit board 41 of the backplane 40 and help to hold it in place. Mounting screws affix the circuit board 41 to the tray structure 52 and provide ground connections between the tray structure 52 and the electrical backplane 40. Side brackets 58 are provided to interconnect the tray structure 52 to the fiber distribution shelf 14. The side brackets 58 contain vertical elements 59 that connect directly to the fiber distribution shelf 14 with screws. As such, the side brackets 58 are rigidly affixed to structure of the fiber distribution shelf 14. However, the horizontal elements 60 of the side brackets 58 define sliding tracks that engage the side walls 54 of the tray structure 52. As a result, the tray structure 52 can be selectively removed from the fiber distribution shelf 14 without having to remove the side brackets 58.

The overall bracket assembly 46 retains the electrical backplane 40 entirely within the confines of the open area 42 in between the connector modules 24 and the top panel 44 of the fiber distribution shelf 14. Once set into position, the ribbon cables 38 are used to interconnect the connection ports 39 on the electrical backplane 40 to the electrical ports 50 on the rear of the connector modules 24.

The ribbon cables 38 occupy the space behind the various connector modules 24 as the ribbon cables 38 extend from the connector modules 24 to the circuit board 41. To help orient and retain the ribbon cables 38 in an organized space efficient manner, the ribbon cables 38 are engaged by a removable cable management plate 66.

Figure 4:
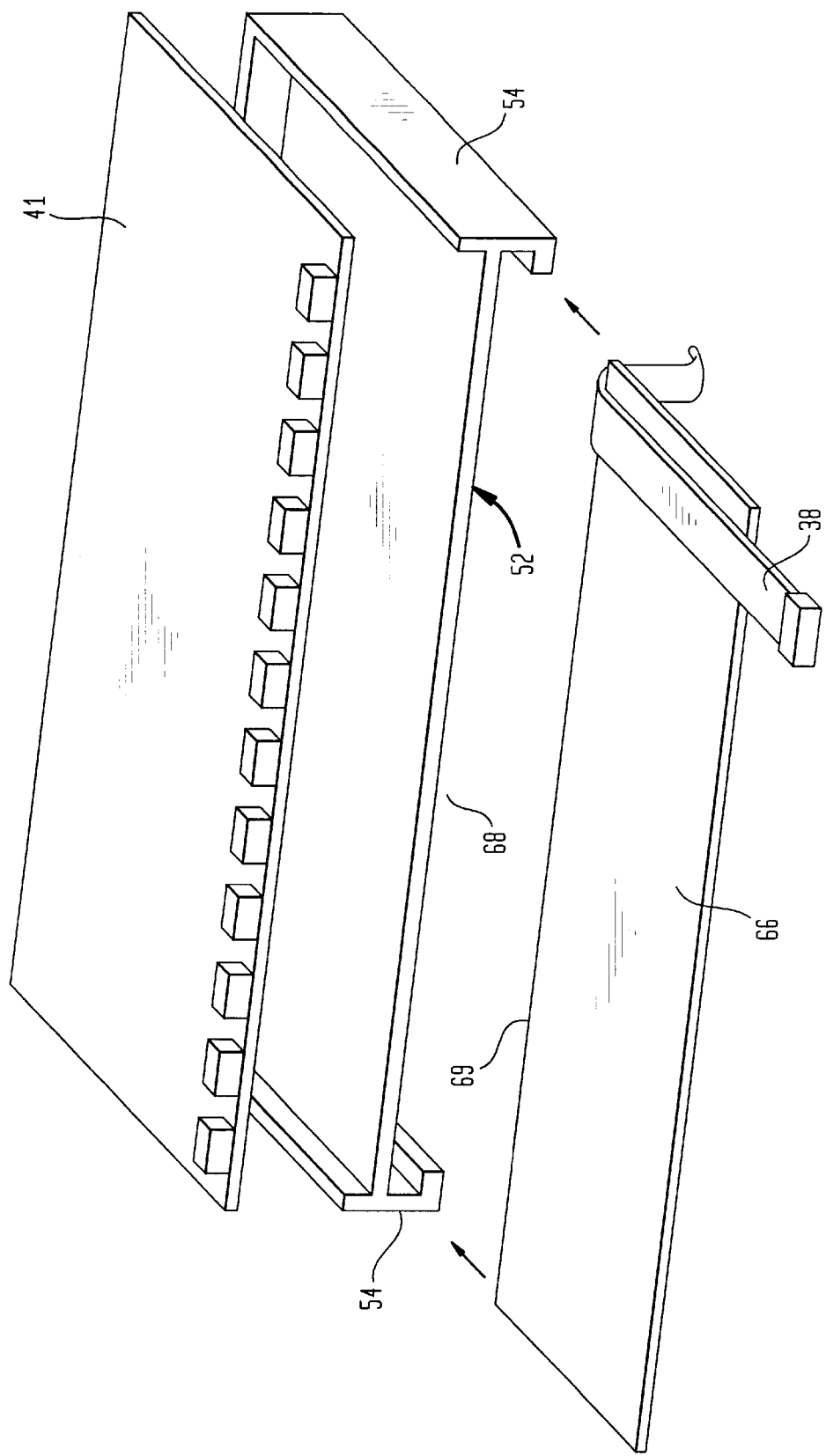
FIG. 4 is a fragmented perspective view of the rear of a tray structure, to illustrate the interconnection of a cable management plate to the tray structure.

Referring to FIG. 4, a first embodiment of the tray structure 52 of the backplane assembly is shown. In this embodiment, the sides 54 of the tray structure 52 extend downwardly and then toward each other in an L-shape. The shape of sides 54 of the tray structure 52 define a slot 68 below the tray structure 52 that extends the length and width of the tray structure 52. The slot 68 is sized to accept and retain the cable management plate 66.

To utilize the cable management plate 66, the ribbon cables 38 are connected between the circuit board 41 and the various connector modules 24 (FIG. 3). After the ribbon cables 38 are connected, the cable management plate 66 is set into place into the slot 68. As the cable management plate 66 advances into the slot 68, the forward edge 69 of the cable management plate 66 engages the ribbon cables 38. The cable management plate 66 causes the ribbon cables 38 to run along the bottom of the tray structure 52 in between the bottom surface of the tray structure 52 and the cable management plate 66. As a result, the cable ribbons 38 do not hang freely under the tray structure 52. Rather, the ribbon cables 38 run neatly up from the connector modules 24 (FIG. 3), under the tray structure 52, between the cable management plate 66 and the tray structure 52. As a consequence, the area behind the connector modules 24 (FIG. 3) is not cluttered with hanging cable ribbons 38. It is therefore much easier for a technician to view the rear of the connector modules and perform tasks without inadvertently disrupting one of the ribbon cables.

In the embodiment of FIG. 4, the slot 68 that holds the cable management plate 66 is formed as part of the tray structure 52 that supports the circuit board 41. Such an embodiment is merely exemplary. It should be understood that the slot 68 that supports the cable management plate 66 can be formed as part of the brackets 58 (FIG. 3) that support the tray structure 52. In such an embodiment, the brackets would provide the slot structure needed to support the cable management plate directly below the tray.

The embodiments of the present invention specifically shown and described are merely exemplary and a person skilled in the art can make alternate embodiments using different configurations and functionally equivalent components. All such alternate embodiments are intended to be included in the scope of this invention as set forth in the following claims.

What is claimed is:

1. In an assembly having a circuit board and a plurality of wires that extend from said circuit board, a device for orienting said plurality of wires, comprising:
    a support tray having a top surface and a bottom surface, wherein said top surface is adapted to have the circuit board mounted thereto; and
    a planar element positionable below said support tray, wherein said planar element engages the plurality of wires and causes said plurality of wires to extend along said bottom surface of said support tray between said bottom surface of said support tray and said planar element.

2. The device according to claim 1, wherein said support tray has side surfaces that define a slot structure below said bottom surface, and said slot structure is sized to receive said planar element therein.

3. The device according to claim 1, further including brackets that support both said support tray and said planar element in the assembly.

4. The device according to claim 3, wherein said brackets define a slot structure that engages said planar element and supports said planar element below said bottom surface of said support tray.

5. The device according to claim 1, wherein said planar element is parallel to said bottom surface of said support tray.

6. In an optical fiber administration system having a plurality of fiber distribution shelf assemblies and a central systems controller, an improved fiber distribution shelf assembly, comprising:
    a shelf structure defining a confined space;
    a plurality of connector modules supported by said shelf structure within said confined space;
    a circuit board;
    a support tray for supporting said circuit board within said confined space, wherein said support tray has a top surface that faces said circuit board and a bottom surface;
    a plurality of leads electrically coupling said connection modules to said circuit board within said confined space; and
    a support element for supporting said plurality of leads within said confined space, wherein said support element mounts below said support tray and engages said plurality of leads to cause said plurality of leads to extend across said bottom surface of said support tray between said bottom surface of said tray and said support element.

7. The assembly according to claim 6, further including a bracket assembly, wherein said bracket assembly mounts to said shelf structure within said confined space and supports said support tray within said confined space.

8. The assembly according to claim 7, wherein said bracket assembly supports said support element under said support tray within said confined space.

9. The assembly according to claim 6, wherein said support tray has side surfaces that define a slot structure below said bottom surface, and said slot structure is sized to receive said support element therein.

10. The assembly according to claim 6, wherein said shelf structure has a top and said circuit board, said support tray and said support element are disposed between said top and said plurality of connector modules within said confined space of said shelf structure.

11. The assembly according to claim 6, wherein said circuit board includes a plurality of electrical connectors wherein each of said connector modules is coupled to a corresponding one of said electrical connectors with one of said plurality of leads.

12. In an optical fiber distribution shelf containing a plurality of connector modules disposed within a shelf structure and a systems interface module disposed in the same shelf structure, wherein said connector modules and said systems interface are connected by a plurality of leads, a method of reducing the space occupied by those leads in the shelf structure, comprising the steps of:
    mounting the systems interface module to a support tray, wherein said support tray is contained entirely within the shelf structure;

positioning a support element under said support tray, wherein said support element engages the plurality of leads extending from the systems interface module and cause said plurality of leads to extend across said bottom surface of said support tray between the support tray and the support element.

13. The method according to claim 12, wherein said support tray defines a slot structure and said step of positioning a support element includes placing said support element in said slot structure.

14. The method according to claim 12, further including the steps of:

mounting brackets to said shelf structure; and mounting said support tray to said brackets.

15. The method according to claim 14, wherein said brackets define a slot structure and said step of positioning a support element includes placing said support element in said slot structure.

\* \* \* \* \*